UNITED STATES PATENT OFFICE.

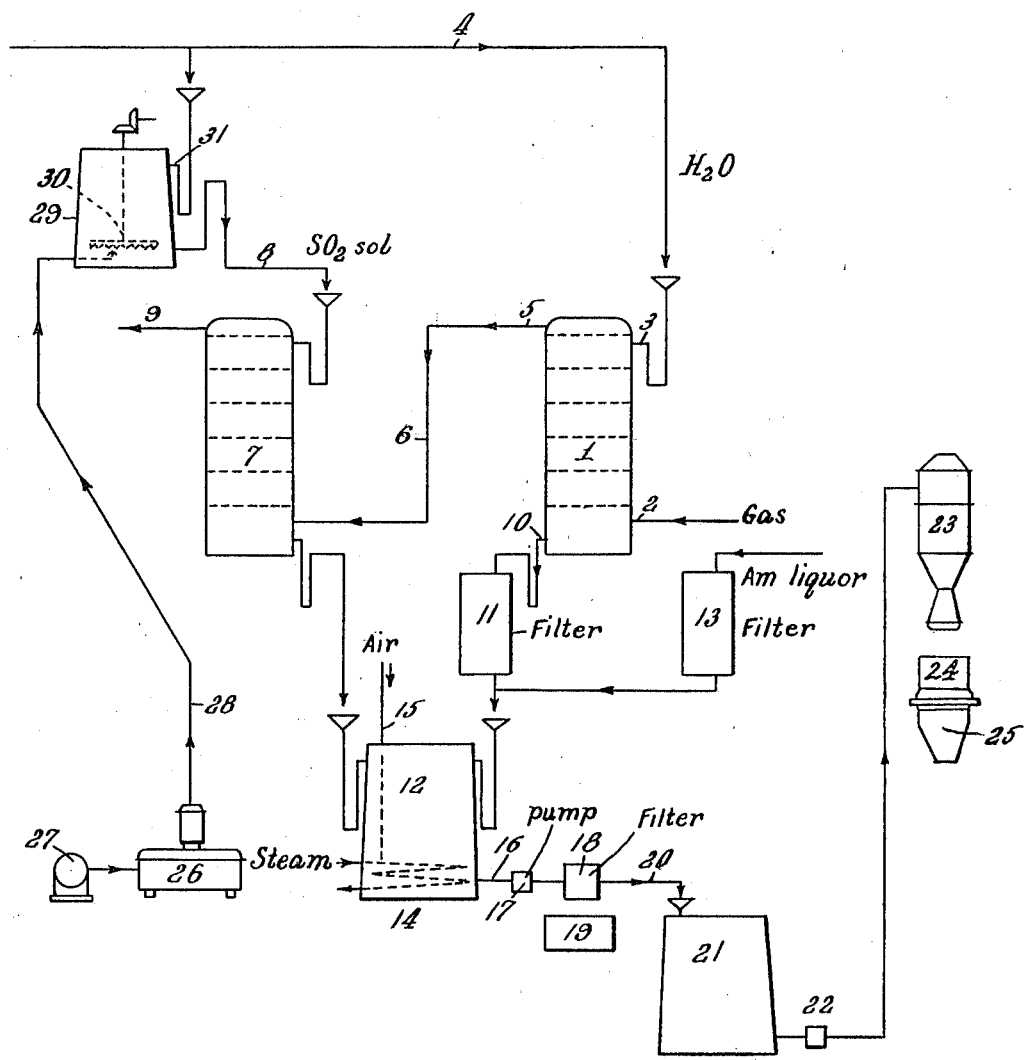

FREDERICK H. WAGNER, OF BALTIMORE, MARYLAND.

PROCESS OF PURIFYING GAS AND RECOVERING BY-PRODUCTS.

1,020,168.  Specification of Letters Patent.  Patented Mar. 12, 1912.

Application filed October 24, 1911. Serial No. 656,233.

*To all whom it may concern:*

Be it known that I, FREDERICK H. WAGNER, a citizen of the United States, residing at Baltimore, in the State of Maryland, have invented certain new and useful Improvements in Processes for Purifying Gas, of which the following is a specification.

This invention relates to processes of purifying gas; and it comprises a process of purifying gas and recovering the valuable by-products which is applicable to illuminating gas, coke oven gas, producer gas, etc., containing ammonia and hydrogen sulfid, as well as other volatile sulfur derivatives and compounds, wherein such gas is treated to remove ammonia, is then washed with a solution of sulfurous acid to remove hydrogen sulfid and sulfur compounds and the resulting wash liquor containing sulfur acids or other sulfur compounds and free sulfur is mixed with the ammoniacal liquor obtained in the recovery of ammonia, and the mixture is finally treated to obtain ammonium sulfate and free sulfur, such sulfur being then used, if desired, to produce the sulfurous acid solution employed in the removal of hydrogen sulfid; all as more fully hereinafter set forth and as claimed.

Gas for lighting and power purposes, such as is obtained by various methods of involving distillation or partial combustion of coal, invariably contains, among other impurities, considerable quantities of ammonia and of hydrogen sulfid together with other sulfur compounds. For whatever purpose the gas is to be employed, it is always necessary to free the gas as completely as possible from impurities of all kinds and especially from the two specifically referred to. Ammonia is a valuable by-product and particularly so in the commercial form of ammonium sulfate, and it is therefore, aside from the matter of purifying gas, desirable to recover it as completely as may be. The sulfur of the hydrogen sulfid is less valuable as a by-product, but its recovery in the process is, however, of economical importance. Ammonia and hydrogen sulfid are however among the most difficult of all the impurities to remove from gas, traces remaining as a rule even after the most careful treatment by purification methods heretofore known.

It is the object of the present invention to perfect the purification of gases of the classes mentioned, by a simple, cheap and ready method and particularly as regards the complete removal of ammonia and hydrogen sulfid, and at the same time to simplify such purification to a degree before unattainable while recovering the sulfur and ammonia in the commercially valuable form of sulfate of ammonia.

According to the present invention, the gas which is to be purified and which has usually best been preliminarily treated to remove cyanogen compounds as by washing in the presence of sulfate of iron, and cooled to remove part of the ammonia by condensation, is washed or scrubbed in a suitable apparatus to remove as much of the residual ammonia as possible. This washing or scrubbing may be done with water. Any ammonia passing on in the gas is subsequently recovered. In this washing to recover ammonia some hydrogen sulfid is also removed, largely in combination with the ammonia; but the greater part passes on with the gas current. To free the gas from the remaining hydrogen sulfid, the gas is next washed with a solution of sulfur dioxid in water, that is, sulfurous acid, the sulfurous acid reacting with the hydrogen sulfid of the gas to give free sulfur and water, with the formation of various more or less complex sulfur acids included under the general term "thionic acids". Any ammonia passing the first scrubbing is caught in this acid liquor forming ammonia salts. This wash liquor containing suspended free sulfur, sulfur compounds, and sulfur dioxid is treated with the ammoniacal wash liquor obtained as above described, (with which ammoniacal liquor from other sources such as the gas liquor obtained by condensation, may be combined if desired) compounds of ammonia and the various sulfur acids present being formed.

The ammoniacal liquor obtained by scrubbing the gas with water is, comparatively, of simple composition; but the ammoniacal liquid obtained by cooling and condensation is more complicated in its constitution, containing ammonia compounds of many bodies. Insofar as these other bodies are sulfur compounds, they react to a large extent with the acid solution under the conditions here employed with the ultimate result of forming ammonium sulfate and free sulfur. Other organic bodies in combination with the ammonia are simply displaced by the acid. It is best to filter both these ammoniacal liquids prior to use in the described way, through a coke or similar filter for the purpose of removing tar and tarry compounds as far as possible. This treatment in the presence of ammonia is best carried on under oxidizing conditions favoring the ultimate transformation of such ammonia compounds into ammonium sulfate with accompanying deposition of free sulfur. The mixed liquids are heated. Air may be blown in to accelerate the reactions, if desired. Other oxidants may be employed. The tendency of salts of all sulfur acids upon heating however is to undergo molecular change with the ultimate production of sulfates and sulfur where enough oxygen is present. The free sulfur remaining unacted upon by the ammonia, as well as that resulting from the oxidation of the thionates, may be separated from the dissolved ammonium sulfate by any appropriate method as by filter pressing, and the ammonium sulfate may then be recovered as crystallized salt. The solution may be evaporated in any usual type of evaporator, such as a vacuum pan or a multiple effect pan.

The present process will be specifically described in its application to the purification of gases derived from the destructive distillation of coal, and in connection with the accompanying drawings in which is shown in diagrammatic elevation an arrangement of apparatus suitable for use in practicing the process. Gas, from which the readily condensable impurities such as tar and a part of the ammonia have been removed by cooling, and which may also have been treated to remove cyanogen compounds, as by contacting with sulfate of iron, enters the base of scrubber 1 through inlet 2 and passes upwardly against a counterflowing stream of water introduced at 3 from main 4, which removes ammonia and a portion of the hydrogen sulfid. This scrubbing with water should be of sufficient extent, as by the use of several scrubbers in series, if necessary, to remove substantially all of the ammonia. The gas containing a large amount of unabsorbed hydrogen sulfid leaves the ammonia scrubber at 5, and passes by way of conduit 6 to tower 7 which it enters near its base. Passing upward through this tower, the gas is scrubbed with a strong water solution of sulfur dioxid in water (sulfurous acid) which is fed into the tower near its top from supply pipe 8. This solution should contain an excess of sulfur dioxid over the amount required to react on the hydrogen sulfid. Here sulfur dioxid and hydrogen sulfid react as before explained, and the gas, purified from the hydrogen sulfid and from ammonia, passes off at 9. Unless the gas be preliminarily freed from carbon dioxid, which may be done if desired, the gas thus issuing from the hydrogen sulfid scrubber may still contain part of the carbon dioxid originally present, and may be purified therefrom by known methods, as by passage through lime purifiers. Lime purifiers will also remove any sulfur dioxid passing onward.

The ammoniacal wash liquor leaving the ammonia scrubber at 10 passes through suitable means 11, such as a coke filter, to remove suspended impurities, whence it is discharged into mixing or converting tank 12 where it mingles with the acid liquor flowing from the hydrogen sulfid scrubber. Ammoniacal liquor produced by condensation at some earlier stage in the gas-making process and freed of suspended impurities by passing through coke filter 13 is best added to the liquor coming from the ammonia scrubber and introduced with it into the mixing tank. In the mixing tank are formed numerous more or less complex compounds containing ammonia and sulfur, including probably sulfates, sulfites, thionates, polythionates, etc. The resulting mixture is heated by suitable means such as steam coil 14, and it is best to blow in air as at 15 to accelerate the oxidation of the ammonia salts into sulfate. Sulfites, thionates and the like when heated, as stated, decompose with the formation of sulfates and the deposition of free sulfur; and the reaction is hastened by blowing in air during the boiling. As before stated, the solution supplied to the hydrogen sulfid scrubber contains an excess of sulfur dioxid, and this excess is best sufficient to render the reaction of the mixture in the oxidation tank distinctly acid at all times. This insures complete binding of the ammonia and also tends to improve the physical condition of the precipitated sulfur. Sulfur deposited in the bottom of the oxidation tank is removed through suitable clean-out doors, not shown.

The solution of ammonium sulfate containing more or less suspended sulfur obtained in the oxidation tank may be conveyed by means of pipe 16 and pump 17 to filter press 18 where the free sulfur is removed and collected at 19. The resulting clear solution of ammonium sulfate may then be sent through 20 to a storage tank 21, whence it is withdrawn as needed by pump 22 and conveyed to suitable evaporating apparatus 23 for concentration and recovery of ammonium sulfate. The sulfate crystals thus produced are dried in centrifugal 24 and collected in 25.

The free sulfur recovered at the several points in the purifying plant above described may be utilized in any convenient way but most advantageously a sufficient amount of it is burned to sulfur dioxid and dissolved in water to supply the sulfurous acid solution employed to remove hydrogen sulfid. This is economical and renders the process complete. The recovered sulfur, with added sulfur if necessary, may be burned in sulfur stove 26 to which air is supplied by compressor 27, the sulfur dioxid fumes being conveyed through 28 to mixing tank 29 provided with stirring means 30 and having water inlet 31 supplied from the water main. The sulfurous acid solution formed in this tank is withdrawn as required and fed to tower 7 as hereinbefore described. Any sulfuric acid formed in burning and solution is of advantage in the process.

In the described process it will be seen that by an advantageous coöperation of steps two of the impurities of the gas, ammonia and sulfur, are removed and jointly converted into a commercially valuable product, ammonium sulfate.

In a modification of the described invention, gas which has been freed from cyanogen compounds but still containing hydrogen sulfid and ammonia may be directly scrubbed with a solution of sulfur dioxid in water. This will remove both the ammonia and the sulfureted hydrogen, giving a solution containing an excess of sulfurous acid together with various ammonia salts of sulfur acids. This solution may be treated as described. Or, and advantageously, the amount of sulfur dioxid in excess may be so great as to permit the addition of the ammonia liquor recovered by direct condensation of the gas elsewhere. The liquid produced by the admixture and containing ammonia and sulfur compounds is boiled and otherwise treated as before described.

In all embodiments of this process the gas treated is best previously freed from cyanogen compounds. The removal of the cyanogen compounds may be by any of the usual methods.

What I claim is:—

1. In the purification of gas and the recovery of by-products, the process which comprises scrubbing gas containing hydrogen sulfid with a liquor consisting of a solution of sulfur dioxid in water.

2. In the purification of gas and the recovery of by-products, the process which comprises scrubbing the gas to remove ammonia and then scrubbing the gas with a solution of sulfurous acid to remove hydrogen sulfid.

3. In the purification of gas and the recovery of by-products, the process which comprises scrubbing the gas to remove ammonia and then scrubbing the gas with a solution of sulfurous acid, uniting the wash liquors from the two scrubbing operations and treating to obtain ammonium sulfate.

4. In the purification of gas and the recovery of by-products, the process which comprises scrubbing gas containing hydrogen sulfid with a liquor consisting of a solution of sulfur dioxid in water to obtain a liquid comprising sulfurous acid in excess and treating said liquid in the presence of ammonia to obtain ammonium sulfate.

5. In the purification of gas and the recovery of by-products, the process which comprises removing cyanogen compounds and condensing out ammonia and scrubbing gas thus purified with a solution of sulfurous acid.

6. In the purification of gas and the recovery of by-products, the process which comprises removing cyanogen compounds and condensing out ammonia, scrubbing the gas thus purified with water to remove further ammonia and then scrubbing with sulfurous acid solution.

7. In the purification of gas and the recovery of by-products, the process which comprises removing cyanogen compounds and condensing out ammonia, scrubbing the gas thus purified with water to remove further ammonia, then scrubbing with sulfurous acid solution, uniting the liquid obtained in the first scrubbing with that from the second scrubbing and treating the mixed liquids to obtain ammonium sulfate.

8. In the purification of gas and the recovery of by-products, the process which comprises removing cyanogen compounds and condensing out ammonia, scrubbing out residual ammonia with water, then scrubbing with a solution of sulfurous acid, uniting the ammonia condensed out and the ammonia scrubbed out with the liquid from the acid scrubbing and treating the liquid to recover ammonium sulfate.

9. In the purification of gas and the recovery of by-products, the process which comprises freeing combustible gas of cyanogen compounds and condensing out ammonia, scrubbing the thus treated gas with water to abstract residual ammonia, scrubbing with sulfurous acid to remove sulfureted hydrogen, uniting the wash liquor from the acid scrubbing with the condensed ammoniacal liquid and the scrubbed-out ammonia, heating and oxidizing the solution, removing free sulfur from the solution and evaporating to recover ammonium sulfate.

10. In the purification of gas and the recovery of by-products, the process which comprises freeing combustible gas of cyanogen compounds and condensing out ammonia, scrubbing the thus treated gas with water to abstract residual ammonia, scrubbing with sulfurous acid solution to remove sulfureted hydrogen, filtering the condensed ammoniacal liquid and the liquid from the first scrubbing, uniting the filtered liquids with the wash liquid from the acid scrubbing operation, heating and oxidizing the solution, removing free sulfur from the solution and evaporating to recover ammonium sulfate.

11. In the purification of gas, the process which comprises scrubbing combustible gas containing hydrogen sulfid with a liquor consisting of a solution of sulfur dioxid in water.

12. In the purification of gas and the recovery of by-products, the process of treating combustible gas which comprises condensing out ammonia, scrubbing the thus treated gas with water to abstract residual ammonia, scrubbing with sulfurous acid solution to remove sulfureted hydrogen, filtering the condensed ammoniacal liquid and the liquid from the first scrubbing, uniting the filtered liquids with the wash liquid from the acid scrubbing operation, heating and oxidizing the solution, removing free sulfur from the solution and evaporating to recover ammonium sulfate.

In testimony whereof I affix my signature in presence of two witnesses.

FREDERICK H. WAGNER.

Witnesses:
   CHAS. B. MANN,
   G. FRED. VOGT.